US006647393B1

(12) United States Patent
Dietterich et al.

(10) Patent No.: US 6,647,393 B1
(45) Date of Patent: *Nov. 11, 2003

(54) DYNAMIC DIRECTORY SERVICE

(75) Inventors: Daniel J. Dietterich, Acton, MA (US); Robert S. Phillips, Brookfield, MA (US); John B. Carter, Salt Lake City, UT (US); Scott H. Davis, Groton, MA (US); Steven J. Frank, Hopkinton, MA (US); William Abraham, Windham, NH (US)

(73) Assignee: Mangosoft Corporation

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/850,137

(22) Filed: May 2, 1997

Related U.S. Application Data (63) Continuation-in-part of application No. 08/754,481, filed on Nov. 22, 1996, now Pat. No. 6,148,377, and a continuation-in-part of application No. 08/827,534, filed on Mar. 28, 1997, now Pat. No. 5,918,229.

(51) Int. Cl.[7] .............................................. G06F 17/30
(52) U.S. Cl. ......................................... 707/102; 707/10
(58) Field of Search ................................... 707/1–200

(56) References Cited

U.S. PATENT DOCUMENTS

| | | | |
|---|---|---|---|
| 4,096,567 A | 6/1978 | Millard et al. ............... 364/200 |
| 4,426,688 A | 1/1984 | Moxley ....................... 365/200 |
| 4,868,738 A | * 9/1989 | Kish et al. ................... 395/846 |
| 4,914,571 A | * 4/1990 | Baratz et al. ................. 707/10 |
| 4,934,764 A | 6/1990 | Leitermann et al. |
| 5,055,999 A | 10/1991 | Frank et al. |
| 5,117,350 A | * 5/1992 | Parrish et al. ................. 711/1 |
| 5,119,481 A | 6/1992 | Frank et al. |
| 5,226,039 A | 7/1993 | Frank et al. |
| 5,245,563 A | 9/1993 | Hauck, Jr. |
| 5,247,673 A | * 9/1993 | Costa et al. ................. 711/205 |
| 5,251,308 A | 10/1993 | Frank et al. |
| 5,274,789 A | 12/1993 | Costa et al. ................. 711/206 |
| 5,282,201 A | 1/1994 | Frank et al. |
| 5,297,265 A | 3/1994 | Frank et al. |
| 5,313,647 A | 5/1994 | Kaufman et al. |
| 5,335,325 A | 8/1994 | Frank et al. |
| 5,341,483 A | 8/1994 | Frank et al. |
| 5,390,316 A | 2/1995 | Cramer et al. ............... 395/425 |
| 5,394,555 A | 2/1995 | Hunter et al. ................ 711/148 |
| 5,408,649 A | 4/1995 | Beshears et al. ............. 395/575 |
| 5,452,447 A | 9/1995 | Nelson et al. |
| 5,483,652 A | * 1/1996 | Sudama et al. ............... 707/10 |
| 5,485,455 A | * 1/1996 | Dobbins et al. ............. 370/255 |
| 5,490,272 A | 2/1996 | Mathis et al. ................ 395/650 |
| 5,493,728 A | 2/1996 | Solton et al. |
| 5,513,314 A | 4/1996 | Kandasamy et al. |
| 5,519,855 A | 5/1996 | Neeman et al. .............. 395/600 |
| 5,522,045 A | 5/1996 | Sandberg ..................... 395/200 |
| 5,551,035 A | 8/1996 | Arnold et al. ............... 395/650 |
| 5,560,029 A | 9/1996 | Papadopoulos .............. 395/800 |
| 5,588,147 A | 12/1996 | Neeman et al. .............. 395/601 |

(List continued on next page.)

OTHER PUBLICATIONS

"Support for Collaborative Design: Agents and Emergence, Edmonds et al.," Communications of the ACM, Jul. 1994, vol. 37, No. 7, pp. 41–47.

(List continued on next page.)

*Primary Examiner*—Wayne Amsbury
(74) *Attorney, Agent, or Firm*—Proskauer Rose LLP (57) ABSTRACT

In a network of computer nodes, a directory service provides both the physical location of directory information around the network and the directory information itself in a single data structure. This single data structure is distributed throughout the network, and continuously redistributed, so as to create a directory service that is both more flexible, and more robust, than prior art directory services.

14 Claims, 5 Drawing Sheets

U.S. PATENT DOCUMENTS

| | | | |
|---|---|---|---|
| 5,592,625 A | | 1/1997 | Sandberg ................... 395/200 |
| 5,608,903 A | * | 3/1997 | Prasad et al. ................. 707/10 |
| 5,613,079 A | | 3/1997 | Debique ..................... 395/468 |
| 5,617,537 A | | 4/1997 | Yamada et al. ............. 395/200 |
| 5,634,004 A | | 5/1997 | Gopinath et al. ...... 395/200.02 |
| 5,649,194 A | * | 7/1997 | Miller et al. ................ 707/200 |
| 5,675,787 A | * | 10/1997 | Miller et al. ................ 707/104 |
| 5,687,308 A | | 11/1997 | Jardine et al. ......... 395/182.02 |
| 5,689,700 A | * | 11/1997 | Miller et al. .................. 707/10 |
| 5,692,183 A | | 11/1997 | Hapner et al. .............. 395/614 |
| 5,692,193 A | | 11/1997 | Jagannathan et al. ....... 395/676 |
| 5,696,900 A | * | 12/1997 | Nishigaya et al. .......... 709/229 |
| 5,701,462 A | | 12/1997 | Whitney et al. ............ 395/610 |
| 5,727,150 A | | 3/1998 | Laudon et al. .............. 395/200 |
| 5,727,203 A | | 3/1998 | Hapner et al. .............. 395/614 |
| 5,758,343 A | * | 5/1998 | Vigil et al. ................... 707/10 |
| 5,768,510 A | | 6/1998 | Gish ..................... 395/200.33 |
| 5,781,537 A | | 7/1998 | Ramaswami et al. ....... 370/254 |
| 5,805,785 A | | 9/1998 | Dias et al. ............. 395/182.02 |
| 5,805,786 A | | 9/1998 | Badovinatz et al. ... 395/182.02 |
| 5,812,533 A | | 9/1998 | Cox et al. ................... 370/259 |
| 5,812,751 A | | 9/1998 | Ekrot et al. ............ 395/182.02 |
| 5,815,710 A | | 9/1998 | Martin et al. ............... 395/683 |
| 5,832,514 A | | 11/1998 | Norin et al. ................. 707/202 |
| 5,848,419 A | | 12/1998 | Hapner et al. .............. 707/103 |
| 5,933,826 A | * | 8/1999 | Ferguson ....................... 707/9 |
| 6,115,549 A | * | 9/2000 | Janis et al. .................. 717/172 |
| 6,148,377 A | * | 11/2000 | Carter et al. ................ 711/147 |

OTHER PUBLICATIONS

"Software Agents," Genesereth et al., Communications of the ACM, Jul. 1994, vol. 37, No. 7, pp. 48–53.

Dryden, P. "Users throwing cache at networks delays" *Computerworld*, Oct. 7, 1996, http://ww.computerworld.com/search/AT–html/9610/961007SL41cacheb.html, originally printed on May 22, 1997, reprinted on Nov. 18, 1998.

Enterprise Networking Web Page, http://www.lancache.com/enad1.html, printed on May 20, 1997.

Measurement Techniques Inc. Web Page, http://www.lancache.com/prl_4.html, printed on May 20, 1997.

Measurement Techniques Inc. Web Page, http://www.lancache.com/slc.html, printed on May 20, 1997.

Network Appliance, Inc. Web Page, http://www.netapp.com/news/level3b/news_rel_970421.html, printed on May 22, 1997.

Network Appliance, Inc. Web Page, http://www.netapp.com/products/level3/netcache/datasheet.html, printed on May 22, 1997.

Peak Technologies, Inc. Web Page, http://www.peak–media.com/PeakJet/quick.html, printed on May 20, 1997.

Network Appliance, Inc. Web Page, http://www.netapp.com/products/level3/webfiler.html, printed on May 22, 1997.

Peak Technologies, Inc. Web Page, http://www.peakJet/PeakJet.html, printed on May 20, 1997.

Relay Web Page, http://www.relay.com/product/gold.html, printed on May 22, 1997.

Sequel Technology Web Page, http://www.sequeltech.com/product/netPIM/prodinfo.html, printed on May 22, 1997.

Stac Inc. Web Page, http://www.stac.com/replica/pr–legato-agreement.html, printed on May 22, 1997.

Henskens et al. "Course and Fine Grain Objects in a Distributed Persistent Store," *Object Orientation in Operating Systems*, 1993, IEEE, pp. 116–123.

Amaral et al., "A Model for Persistent Shared Memory Addressing in Distributed Systems," *Object Orientation in Operating Systems*, 1992, IEEE, pp. 2–11.

Irelenbusch et al. "Towards a Resilient Shared Memory Concept for Distributed Persistent Object Systems," *Proceedings of the 28th Annual Hawaii Intl. Conference on System Sciences*, 1995, IEEE, pp. 675–684.

Lea et al. "COOL: System Support for Distributed Programming," *Communications of the ACM*, vol. 36, No. 9, pp. 37–46.

Anderson et al. "Scheduler Activations: Effective Kernel Support for the User–Level Management of Parallelism," *Operating Systems Review (SIGOPS)*, vol. 25, No. 1, Jan. 1, 1991, pp. 95–109.

Barton–Davis et al. "Adding Scheduler Activations to Mach 3.0," *Proceedings of the USENIX Mach III Symposium*, Santa Fe, NM, USA, APr. 19–21, 1993, pp. 119–136.

Koppe C. "Sleeping Threads: A Kernel Mechanism for Support of Efficient User Level Threads," *Proceedings of Seventh IASTED–ISMM International Conference on Parallel and Distributed Computing and Systems*, Washington, DC, USA, oct. 19–21, 1995, pp. 11–15.

Wilson, Andrew W., "Organization and Statistical Simulation of Hierarchical Multiprocessores," UMI Dissertation Information Service (1985).

Li, Kai, "Shared Virtual Memory on Loosely Coupled Multiprocessors," Yale University, Department of Computer Science, (Sep., 1986).

Wilson, Andrew W., "Hierachical Cache/Bus Architecture for Shared Memory Multiprocessors," *ACM*, pp. 244–252 (1987).

Carter, J.B. et al., "Optimistic Implementation of Bulk Data Transfer Protocols," *In Proceedings of the 1989 Signetrics Conference*, pp. 61–69 (May, 1989).

Carter, J.B. et als., "Distributed Operating Systems Based on a Protected Global Virtual Address Space,"In the Proceedings of the Third Workshop on Workstation Operating Systems (WWOS) (May, 1992).

Carter, J.B. et als., "FLEX: A Tool for Building Efficient and Flexible Systems," In the Proceedings of the Fourth Workshop on Workstation Operating Systems (WWOS) (Oct., 1993).

Carter, John B., "Design of the Munin Distributed Shared memory System," To appear in the special issue of the *Journal of Parallel and Distributed Computing* on distributed shared memory (1995).

Carter, J.B. et als., "Techniques for Reducing Consistency–Related Communications in Distributed Shared Memory Systems," *ACM Transactions on Computer Systems*, pp. 205–243, vol. 13, No. 3 (Aug., 1995).

Carter, J.B. et als., "Reducing Consistency Traffic and Cache Misses in the Avalanche Multiprocessor," University of Utah technical report.

Tricord Systems, Inc. Web Page, http://www.tricord.com/2/10/10–3–96.html, printed on May 22, 1997.

Network Appliance, Inc. Web Page, http://www.netapp.com/products/level3/nfs.html, printed on May 22, 1997.

Network Appliance, Inc. Web Page, http://www.netapp.com/products/level3/ontap.html, printed on May 22, 1997.

Network Appliance, Inc. Web Page, http://www.netapp.com/products/level3/windows.html, printed on May 22, 1997.

Relay Web Page, http://www.relay.com/product/otg.html, printed on May 22, 1997.

* cited by examiner

DYNAMIC DIRECTORY SERVICE

CROSS-REFERENCE TO RELATED APPLICATIONS

This application is a continuation-in-part of co-pending U.S. patent applications Ser. No. 08/754,481, filed Nov. 22, 1996, now U.S. Pat. No. 6,148,377 and Ser. No. 08/827,534, filed Mar. 28, 1997 now U.S. Pat. No. 5,918,229. The entirety of both of these applications is incorporated herein by reference.

TECHNICAL FIELD

The present invention relates in general to directory services and, more specifically, to a dynamic directory service that maintains a directory in which is stored both (1) directory information and (2) information identifying the physical layout or structure of the directory.

BACKGROUND INFORMATION

Computer-based structured storage systems, such as computer file systems and database systems, have been remarkably successful at providing users with quick and facile access to enormous amounts of data. Structured storage systems have allowed businesses to generate and maintain enormous stores of persistent data that the company can modify and update over the course of years. For many companies, this persistent data is a valuable capital asset that is employed each day to perform the company's core operations. The data can be, for example, computer files (e.g., source code, wordprocessing documents, etc.), database records and information (e.g., information on employees, customers, and/or products), and/or Web pages.

A typical computer based structured storage system includes a central server that provides centralized control over the structured store of data. The structured store of data is the information that is being maintained by the system, such as information in the files and directories of a file system or within the records of a database system. The central server provides system services to a plurality of interconnected network client nodes, and each of the client nodes employs the central server to access and manipulate the structured store of data.

It is common to use the central network server to provide a directory service, i.e., a specialized hierarchical database of network, user, and other computer system configuration information. This information typically includes operating system configuration information, application program configuration information, network configuration information, network-accessible resources, exported devices and services, network printers, and user account records. Network user account records are what allow network-wide, unified "log on," and they allow sophisticated application programs to obtain broader, coherent name spaces (e.g., electronic mail system application programs). Novell's Directory Server (NDS), available from Novell, Inc. of Provo, Utah, is one example of software that implements a directory service and that runs on a central server to allow maintenance of and access to directory information.

Although central server directory services such as NDS generally work, problems arise from relying on centralized control. For example, the operation of the network is dependent upon the proper functioning of the central server. Any failure of the server to maintain proper operation, such as a power failure, hardware failure, or other such system failure, will disable the entire network and generally prevent users from obtaining access to the network and its resources. Additionally, a flood of client requests (e.g., access of user account records) can overload the central server and slow down or crash the network. Accordingly, reliance on a centralized, server-based directory service can result in slow operation or total network failure during periods of heavy use.

An additional problem with a client-server network system is that it provides a static operating environment that is set for optimal performance at a certain level of network activity. Consequently, the network fails to exploit available resources to improve system performance. In particular, as the system activity rises above or drops below the expected level of network activity, the static operating environment lacks any ability to reconfigure dynamically the allocation of network resources to one providing better performance for the present level of activity.

Technology has been developed to improve the reliability and operation of a centralized server directory service. This technology involves employing a plurality of central servers. Each of the servers provides a directory service. Whenever the directory information changes, all of the redundant servers are updated so that requests can be made to any of the centralized servers without impacting the correctness of the response.

While this statically replicated technology improves upon the single server arrangement, it generally performs poorly or fails as the size of the network increases. As client nodes are added to the network and more directory servers are added to the network to handle the corresponding increased network load, the sustainable update rate of information managed by the servers decreases because the overhead and complexity of propagating updates (i.e., changes to the data stored in and replicated across the directory servers) increases with the increased network size. Thus, known directory services are inherently read-mostly repositories, and that is the way they are designed and used. That is, known directory services are used only for infrequently-updated directory information.

Examples of this centralized, statically replicated, hierarchical directory service technology include Microsoft's Active Directory (NT 5.0), NDS, Banyan's Streetalk, and X.500 directory services. Lightweight Directory Access Protocol (LDAP) is a "common" protocol that can be used to access data from any compatible directory server such as NDS.

SUMMARY OF THE INVENTION

It is an object of the invention to provide a dynamic directory service that is an improvement over centralized, statically replicated, hierarchical database directory services.

It is also an object of the invention to provide a dynamic directory service that maintains a directory in which is stored both (1) directory information and (2) the physical layout of the directory itself. That is, the invention involves the use of a directory having both information about where to find the directory information of interest as well as the actual directory information.

It is a further object of the invention to provide a dynamic directory service that is more reliable and provides improved fault tolerant operation over existing directory services, and that has the ability to replicate and move data dynamically in response to network activity levels and access patterns. This ability optimizes performance and minimizes the time required to provide directory information (e.g., network configuration information, organizational information, user configuration information, and network-accessible resources such as exported devices and services, network printers, and user account records) to requesting network nodes.

It is yet another object of the invention to provide a dynamic directory service that provides distributed control over a structured store of directory information and that allows that information to be changed and/or updated with higher frequency than generally possible with existing directory services without adversely effecting network performance or network node access times.

It is still another object of the invention to provide a dynamic directory service that maintains and allows access to frequently-changing, as well as infrequently-changed, directory information.

The directory service of the invention maintains both the physical location information and the directory information itself in the same data structure. That data structure is distributed around the network, and all of the directory information is homeless (except, usually, a root record). The distributed directory service of the invention allows network nodes to locate copies of records to which the nodes want access. A globally unique identifier (GUID) is associated with each record as a unique index key that can be used to identify the record on the network. It contains no location information, and a given record can be physically located anywhere on the network. Each of the records also can migrate from physical location (node) to physical location (node) around the network. The invention provides automatic migration and/or replication of directory information among the network nodes without reconfiguring the network nodes and in a manner transparent to users at the nodes. An example of a mechanism that can be used to keep replicated records consistent is a single-writer, multiple-reader, write-invalidate protocol.

The directory service of the invention can, in some specific embodiments, employ a globally-addressable unstructured memory system to maintain simultaneously both the directory information and layout information in accordance with the invention. For example, the directory service can employ the distributed shared memory (DSM) system described in the above-identified, incorporated-by-reference patent applications, which DSM system distributes the storage of data across some or all of the storage devices connected to a network. Storage devices that may be connected to the network and accessible to the network nodes by address via the DSM system include, for example, RAM, hard disk drives, tape drives, floppy disk drives, and CD-ROM drives. In some embodiments, the dynamic directory service is a computer program that interfaces to a DSM system to operate the DSM system as a memory device that provides storage of and access to the directory information. The directory service program can direct the DSM system to map directory information into the shared memory space. The DSM system can include functionality to share, migrate, and replicate data coherently. In one embodiment, the DSM system provides memory device services to the directory service program. These services can include read, write, allocate, flush, or any other similar or additional service suitable for providing low level control of a storage device. The directory service program employs these DSM system services to allocate and access portions of the shared memory space for creating and manipulating the directory information. In connection with these embodiments, a system and related method for accessing directory information includes a computer network, a globally addressable data storage system, and a plurality of computers coupled to the network and the data storage system. The globally addressable data storage system provides persistent storage of data and contains directory information. The plurality of computers access the data storage system to obtain directory information. Based on the access patterns by the computers and/or the available network resources, the data storage system replicates and migrates directory information among two or more of the computers.

In one aspect, the invention relates to a method comprising the steps of providing a plurality of nodes interconnected by a network and storing on one or more of the nodes a directory containing both the directory information and information about the layout of the directory (i.e., where to find the directory information).

In another aspect, the invention relates to a method comprising the steps of providing a plurality of nodes interconnected by a network, providing a directory service on the network by installing on each of the nodes a directory service program that allows directory information to be accessed by each of the nodes and that stores on one or more of the nodes a directory including both the directory information and information about the location of the directory information on the network, and obtaining both the physical location of directory information of interest and the directory information of interest itself by accessing the directory service.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

According to the invention, a computer network system 10 includes a plurality of network nodes that access a common directory service. The directory service is a specialized hierarchical structured database. Examples of the types of information that can be stored and maintained by the directory service include operating system configuration information, application program configuration information, network configuration information, network-accessible resources, exported devices and services, network printers, and network user account records. Each of the nodes on the network includes at least a directory service program that accesses and manages the directory service. The directory service may be stored in an addressable shared memory or it may be stored in a more traditional fashion. For example, each node may be responsible for storing a particular element or elements of the directory service. In such an embodiment, the directory service program can access a desired portion of the structured store using a globally-unique tag or identifier. The underlying system would translate the tag or identifier into one or more commands for accessing the desired data, including network transfer commands. In another embodiment, the directory service is stored in an addressable shared memory space, which allows the network nodes transparently to access portions of the structured store using standard memory access commands. In a preferred embodiment, the tag or identifier is an address into an addressable memory space such as a 128-bit address space.

The system 10 can be a file system, a database system, a Web server, an object repository system, or any other structured storage system that maintains an organized set of data. In the disclosed embodiment, the system 10 is a directory service that maintains various directory information.

Figure 1:
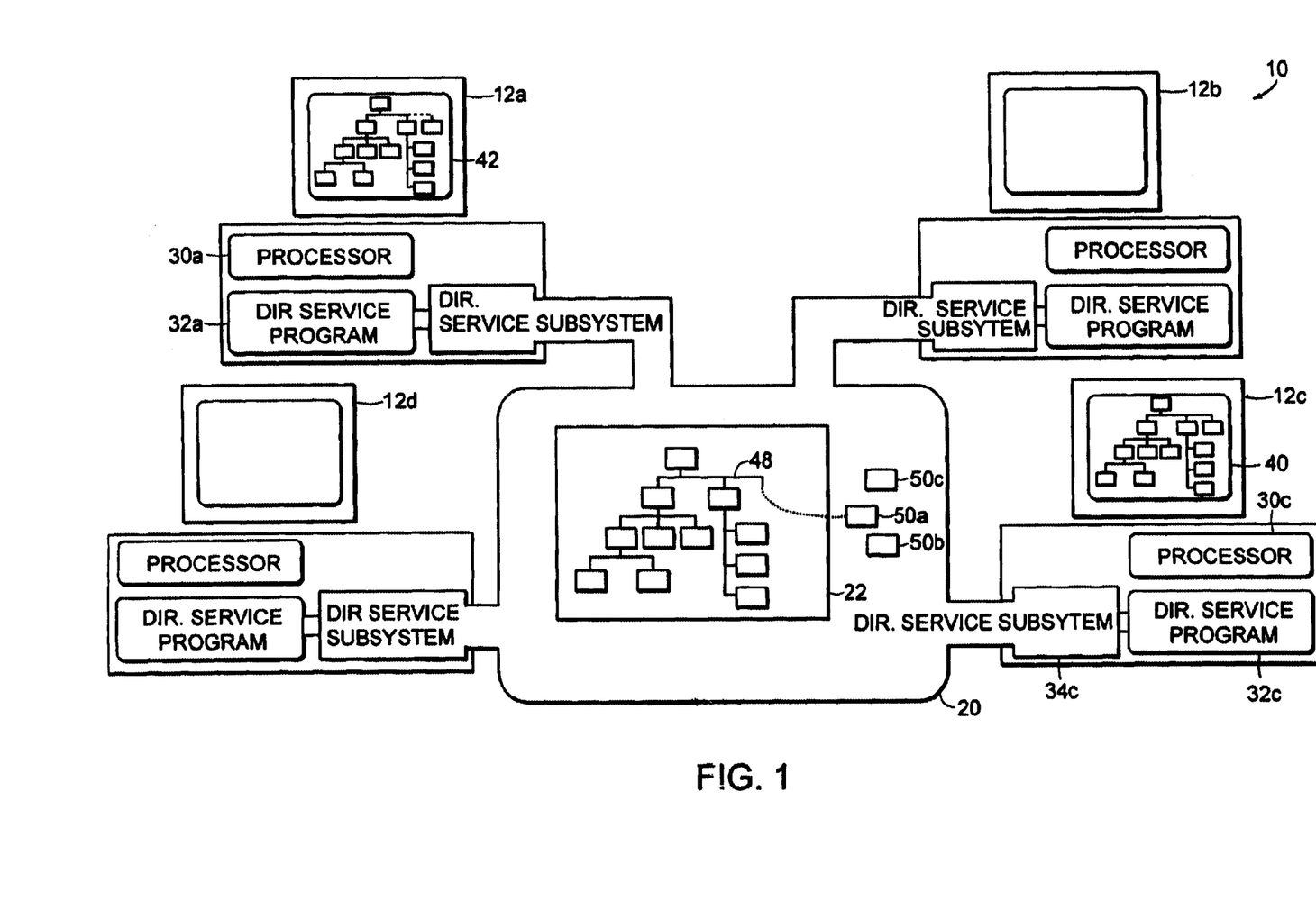
FIG. 1 is a conceptual block diagram of a dynamic directory service according to the invention.

Referring to FIG. 1, in one embodiment, the network system 10 includes a plurality of network nodes 12a–12d and a common directory service subsystem 20 that provides a dynamic directory service 22 according to the invention. The dynamic directory service 22 maintains and provides access to data including both the directory information itself and the physical layout of the directory on the network. Each of the nodes 12a–12d can include several sub-elements. For example, node 12a includes a processor 30a and a directory service program 32a for accessing the directory service 22. One or more of the nodes can include a monitor for displaying graphically (40, 42) the directory service 22.

A system 10 according to the invention can provide, among other things, each network node 12a–12d with shared control over the directory service 22 and, therefore, the system 10 can distribute control of the directory information across the nodes of the network. To this end, each node of the system 10, such as node 12a, includes a directory service program 32a that operates as a structured directory service adapted to maintain directory information and to employ all of the network nodes for storing and allowing access to the directory information. These cooperating elements provide a structured storage system that has a distributed architecture and thereby achieves greater fault tolerance, reliability, and flexibility than known directory services that rely on centralized control and one or more centralized servers. Accordingly, the invention provides computer networks with distributively controlled and readily scaled directory services.

Still referring to FIG. 1, in one embodiment, the system 10 maintains a directory service 22 within a globally addressable unstructured storage system. Each of the nodes 12a–12d can access that storage system and the directory service 22 through the directory service programs 32a–32d. At least a portion of the globally addressable unstructured storage system is supported by a physical memory system that provides persistent storage of data. For example, a portion of the storage system can be assigned or mapped to one or more hard disk drives that are on the network or associated with one or more of the network nodes 12a–12d as local hard disk storage for those particular nodes. Accordingly, FIG. 1 illustrates one possible system that provides the network nodes with access to a globally addressable unstructured storage system, wherein at least a portion of the storage space of that system is assigned to at least a portion of one or more of the persistent storage devices (e.g., hard disks) to allow the nodes addressably to store and retrieve data to and from the one or more persistent storage devices. The globally addressable storage system is described in the above-identified, incorporated-by-reference applications.

Each of the directory service programs 32a–32d is a software module that couples to the directory service. The directory service program 32a can stream data to, and collect data from, the directory service subsystem. Each of the directory service programs 32a–32d can be a peer incarnation (i.e., an instance) residing on a different one of the network nodes 12a–12d.

One or more of the directory service programs 32a–32d can provide a graphical user interface 42 that graphically depicts the directory service 22. The graphical user interface 42 could allow a user at a node, for example at node 12a, to insert directory information graphically within the directory service 22. To this end, the directory service program 32a can generate a set of commands that will present a stream of data that will result in directory information being stored within the directory service 22. As shown in FIG. 1, for node 12c only for simplicity, that node (which includes a graphical user interface 40) reflects the change to the directory service 22 affected by the directory service program 32a of the node 12a. In particular, the graphical user interface 40 of the node 12c can depict to a user that certain directory information is being placed within the directory service 22. As illustrated, a system user at node 12a can direct item 50a to be inserted at a set location within the directory service 22. The directory service program 32a then places the item 50a within the directory service 22 at the proper location. Moreover, node 12c detects the change within the directory service 22 and reflects that change within its graphical user interface 40.

A structured dynamic directory service according to the invention looks to all network nodes like a coherent, single directory service system when in fact it spans all participating nodes coupled to the network. The directory service of the invention differs from known directory services in a variety of ways. For example, the directory service of the invention: maintains data coherence among network nodes; automatically replicates directory information for redundancy and fault tolerance; automatically and dynamically migrates directory information to account for varying network usage and traffic patterns; and provides a variety of other advantages and advances, some of which are disclosed in the above-identified, incorporated-by-reference applications. The replication and migration can be done on the basis of node accesses and/or on the basis of the availability of network resources.

Figure 2:
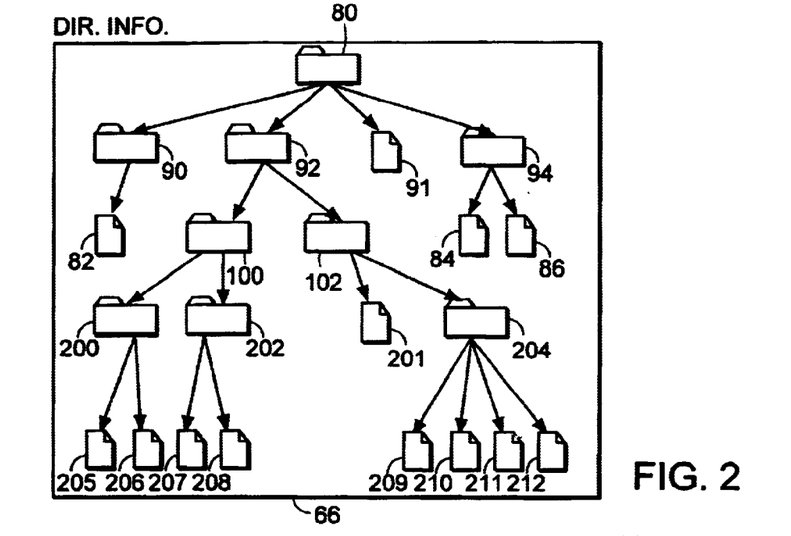
FIG. 2 is a diagram of the types of directory information that can be maintained by a dynamic directory service of the invention.

Referring to FIG. 2, a directory service according to the invention includes a structured store of data organized as a directory information set 66. The set 66 is a tree structure starting at a root 80 and ending at a leaf (for example, leaf 82). Each leaf represents a particular piece of directory information (e.g., user name or password). The set 66 thus is a collection of directory information organized hierarchically, for example as a tree structure or as a graph, rooted in the root 80. The non-leaf nodes in the tree (not including the root 80) are the entries 90, 92, 94, 100, 102, 200, 202, and 204, and the leaves in the tree are particular pieces of directory information 91, 82, 84, 86, 201, and 205-212 (e.g., a password or a network printer identifier) or empty entries. Sub-trees within a set can overlap by linking a leaf or a non-leaf to multiple entries.

The directory service of the invention can, as an option, employ more than one set. A benefit of breaking up the directory service 60 into a plurality of sets is that it may provide more flexible management for users of the directory service. As the directory service grows into very large sizes (e.g., hundreds of nodes with thousands of gigabits of storage), it may be desirable to have the directory information organized into groups of management entities such that management actions can be independently applied to individual groups without affecting the operation of the others.

In a set, the root (e.g., the root 80) provides the starting point to locate the directory information maintained by the directory service of the invention. The root can be, and preferably is, stored in a static and well-known location on the network (e.g., at a particular address or on one or more network nodes). When a node is accessing a set for the first time, it first looks up the root to determine the key associated with the set. Once it has determined the key, the node can access the root of the set. From the root, it then can traverse the set's entire tree to locate the desired piece of directory information.

As an example, in FIG. 2, a network node requesting the password of a user named Jones might pass the following string to the directory service: /USERS/JONES/PASSWORD. The directory service would then reference the set 66 and might find that the root 80 contains a list of all users, the non-leaf node 90 contains information about the user Jones, and the leaf 82 contains user Jones' password. In accordance with the invention, and as described more fully below, all of this information can reside physically on different network nodes and in fact can migrate from node to node and can be replicated on a plurality of network nodes.

FIGS. 3, 4A, 4B, and 5 further and more particularly illustrate the structure of a hierarchical distributed dynamic directory service according to the invention.

Figure 3:
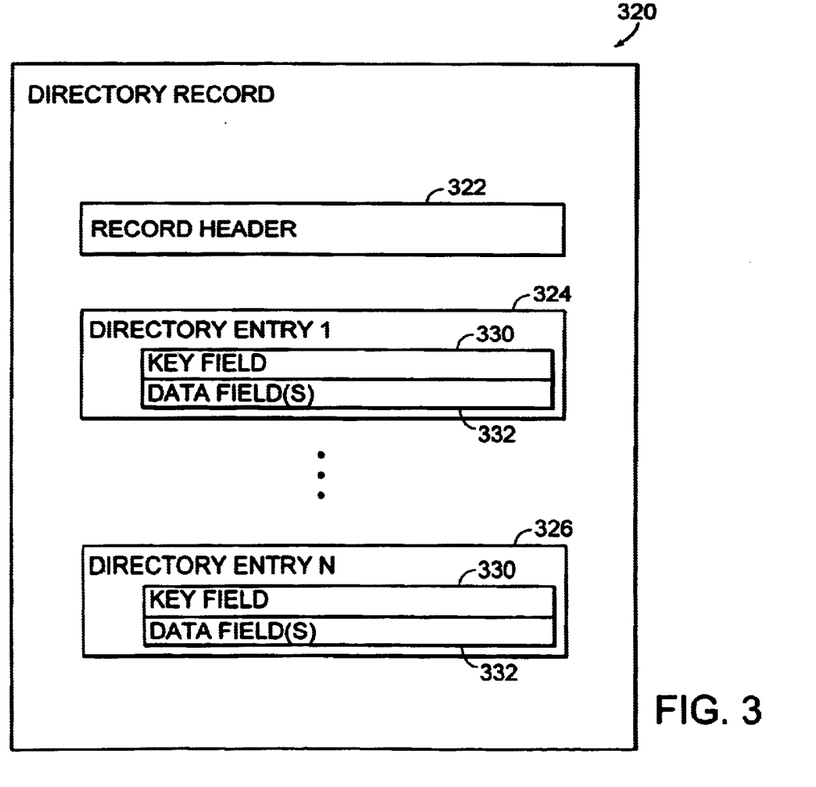
FIG. 3 is a diagram of a directory record used by a dynamic directory service according to the invention.

Referring to FIG. 3, a directory record 320 includes a record header 322 and one or more directory entries (two are shown, 324 and 326). Each directory entry includes a key field 330 and one or more data fields 332. The key field 330 could be, for example, "company name," and the associated data field 332 could be "Acme Corporation." Note that for GUID tree records (described below), there preferably are two data fields, namely "GUID of next record" identifying the identifier of the next record to be referenced by the directory service and "GUID responsible node" identifying the node responsible for the "GUID of next record." The key field 330 could also be a globally unique identifier (GUID). The data field 332 can include actual directory information (for example, "Acme Corporation"), information about where to go to locate the directory information of interest or additional information about where to go to locate it (for example, a globally unique identifier or GUID), or information about what nodes have copies of the directory information of interest.

In one particular embodiment, directory record 320 can be a page of a global address space that spans both persistent (e.g., hard disks) and volatile (e.g., RAM) storage devices. For example, the page can be a 4 kilobyte portion of the shared address space described in the above-identified, incorporated-by-reference applications. In this embodiment, the GUIDs are unique addresses of the global address space such as 128-bit addresses in a huge $2^{128}$ address space.

Referring still to FIG. 3, each directory record 320 includes a record header 322 that includes attribute information for that record, and that attribute information typically is metadata for the directory record. The record 320 further includes one or more directory entries, such as the depicted directory entries 324 and 326, that provide an index into a portion of the directory service (non-leaf entries) or actual directory information (leaf entries). Accordingly, the non-leaf directory entries subdivide the directory information maintained by the directory service of the invention. For example, if the directory entries 324 and 326 are entries of a GUID tree record, they can subdivide the directory into two sub-portions, with the first portion referencing one-half of the directory and the second portion referencing the other half of the directory. Accordingly, in this example, the directory entry 324 provides an index for half of the directory, and in complement thereto the directory entry 326 provides an index for the other half Continuing with this example, each of these directory entries 324, 326 can, via the data fields, point to other records and responsible nodes in which directory entries have data fields that point to still other records and responsible nodes and so on until the actual directory information of interest is located in some data field of some entry of some record by the directory service (a so-called leaf entry). The directory service then provides that directory information to the requesting node. In this way, the directory service of the invention provides both (1) location information for directory information maintained by the directory service and (2) the actual directory information itself, all in the same directory structure.

In accordance with the invention, directory records are indexed by globally unique identifiers (GUIDs), such as 128-bit values. In the directory records, these GUIDs can appear in the data fields or the key fields of various of the directory entries. As described in more detail below, a GUID subtree within the directory provides a map or assignment of GUIDs to network nodes that have a copy of certain directory information. It is the leaf nodes of the GUID subtree that identify the one or more nodes that have a copy of desired directory information. Once these nodes are identified by the directory service, the directory service accesses one or more of them (typically just one of the identified nodes) to obtain the directory information and then pass it to the requesting node. Optionally, the directory system can choose which node to contact to obtain the directory information based on the state of the global system such as the current load on the various nodes or the quality of the network service between the local node and the node(s) that have copies of the desired directory record.

Figure 4A:
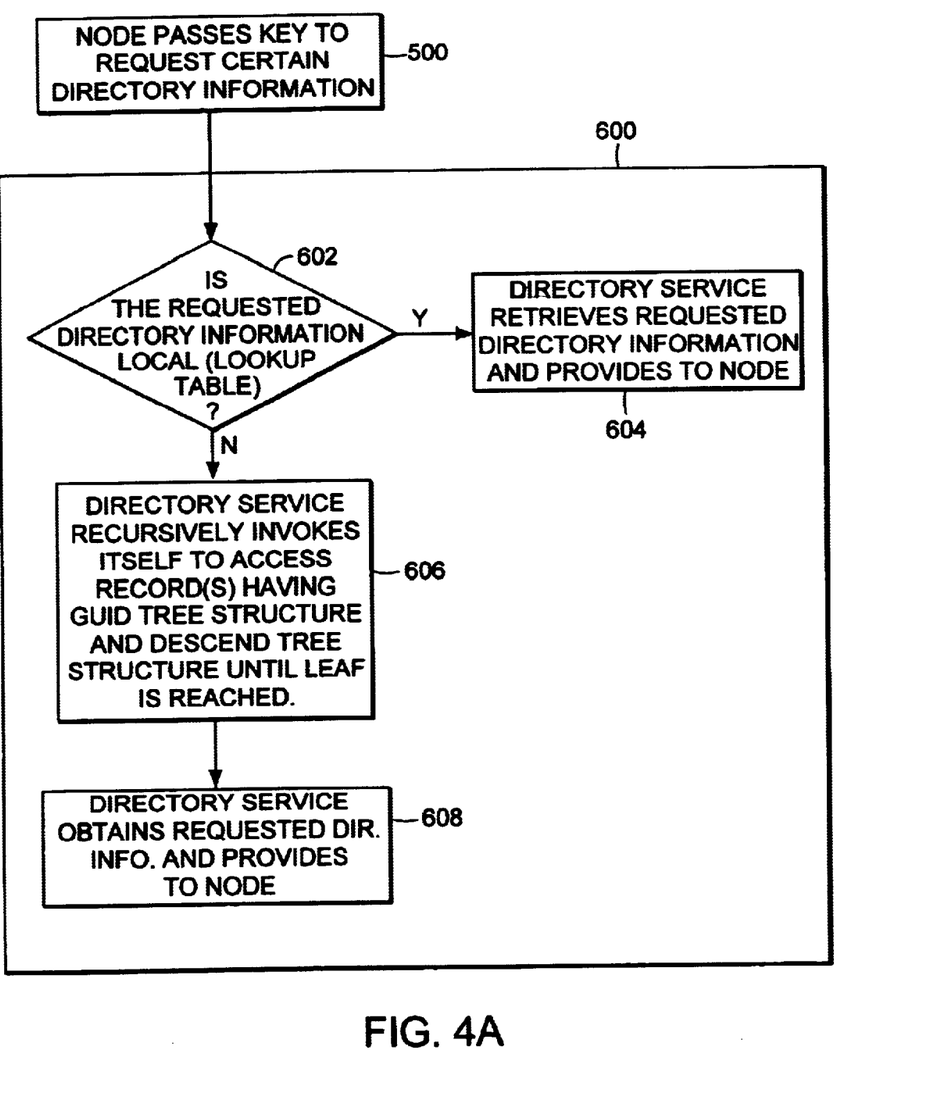
FIG. 4A is a flowchart of the steps a directory service of the invention takes to service a request from a network node for directory information.

Referring to FIG. 4A, to obtain certain desired directory information (e.g., the password of a user named Jones), a network node passes an appropriate key to the directory service (step 500). For example, the node might pass the following key to the directory service: /USERS/JONES/PASSWORD. The directory service receives the key and either locates the desired directory information and passes it to the requesting node or returns an error if the desired directory information cannot be found (step 600). More specifically, in attempting to satisfy the request from the node, the directory service of the invention first determines if the key corresponds to directory information that is stored on the node itself in, for example, the node's RAM or on the node's hard disk (step 602). In the disclosed embodiment, the directory service performs step 602 by accessing a lookup table (such as a hash table) maintained by each of the network nodes. This table identifies the directory records that are locally cached on the node. If the requested directory information is stored locally on the requesting node, the directory service retrieves the requested directory information from the node's local cache and then provides that directory information to the node (step 604). If the requested directory information is not stored locally on the requesting node, the directory service recursively invokes itself to access the directory record(s) that have the GUID tree structure, and the directory service descends or walks the GUID tree by accessing the various records until the desired directory entry is located. The leaf node in the GUID tree contains the mapping from GUID to the set of nodes caching the record associated with that GUID. The directory service uses this information to select a node from which it acquires a copy of the desired record (step 606). The directory service then obtains the requested directory information and provides it to the node (step 608).

It is important to note that, while traversing the GUID tree, the directory service first always checks to see if entries indexed by a GUID are cached locally before the directory service invokes recursively the GUID tree to locate a copy of the record remotely.

At this point, the directory service can store a copy of (replicate) this directory information (e.g., user Jones' password) on the requesting node. Actually, if replication is performed by the directory service, all or a portion of the record that contains this directory information is replicated on the requesting node. If the directory service decides to replicate this record on the requesting node, the directory service adds the requesting node's identifier (e.g., a number) to the leaf node in the GUID tree that stores the list of nodes caching the record associated with the GUID, and the directory service then updates or invalidates the local caches of all of the other network nodes that also have that directory record cached locally.

In one embodiment, the directory service makes the decision on whether or not to replicate based on node access patterns and/or on the availability of certain network resources. For example, if a node has requested a certain record a certain number of times, the directory service will replicate that record on that node. The directory service monitors and records a variety of network information, including node access patterns and network resource availability, and some or all of this network information is used to determine what records should be replicated on what nodes. In accordance with the invention, this replication feature of the directory service results in certain records being replicated on the nodes that most often access those records and not being replicated on (and/or removed from) nodes that access those records less often or not at all. The directory service of the invention provides this replication feature dynamically during normal operation, and thus, as access patterns change, the records and the copies of the records move or migrate among the various network nodes to accommodate the changing patterns. This replication/migration feature of the invention points up an important aspect of the invention, and that is that all of the directory records are homeless (except possibly the root directory record which, while it typically will be replicated, typically is placed at fixed locations on the network).

Because the directory records contain, according to the invention, both the GUID tree structure (i.e., the information about where directory information is located) and the actual directory information, the directory structure (i.e., the GUID tree) is dynamically moved and replicated among the network nodes just as is the directory information itself.

These dynamic replication and migration features provide tremendous benefits to networks utilizing the directory service of the invention. For example, networks utilizing the directory service of the invention can be expanded (i.e., additional nodes can be added to the network and/or other networks can be interconnected to the network) without substantially impacting the performance and speed realized by the nodes as they access directory information via the directory service. That is, the directory service scales very well. This is because, once the network is up and running, all nodes generally will have cached locally the records they most often access, and access times for these nodes for the directory information that is cached locally will be the same (very fast) regardless of the size of or the traffic on the network.

Figure 4B:
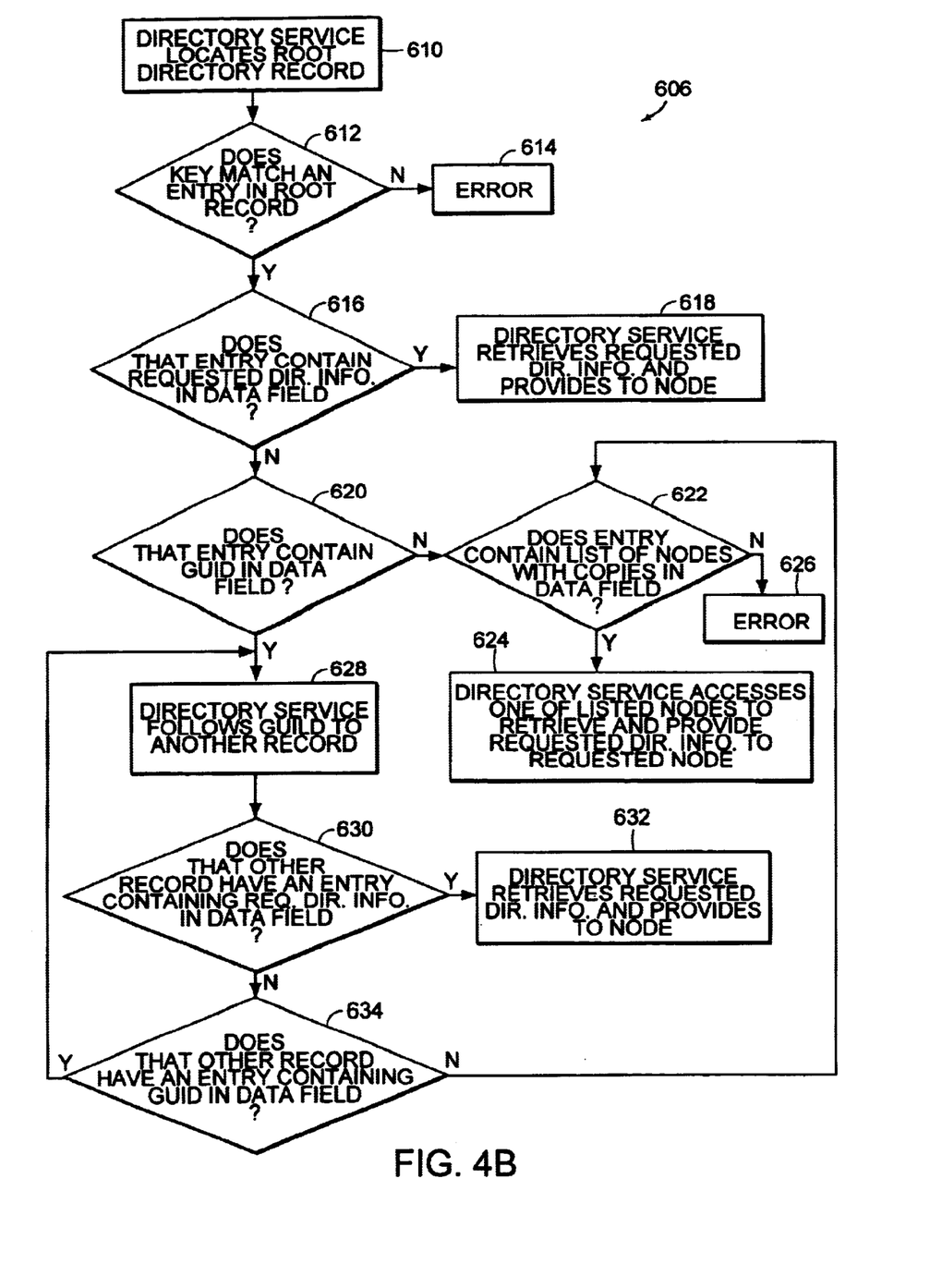
FIG. 4B is a flowchart disclosing additional detail of the steps taken by the directory service to service the network node's request for directory information.

Referring to FIG. 4B, the recursive invocations identified in step 606 (FIG. 4A) are now described in more detail. Step 606 includes the following substeps that are performed by the directory service. The directory service first locates the root directory record (step 610), and it indexes into that record using the key (e.g., /USERS/JONES/PASSWORD) passed to it by the requesting node. The directory service then checks to see if a portion of the key (e.g., /USERS) matches a directory entry in the root directory (step 612). If it does not match, the directory service returns an error message to the requesting node (step 614). If there is a corresponding entry in the root directory, the directory service next determines if that directory entry contains the requested directory information in its data field (step 616). If so, the directory service retrieves the requested directory information from that data field and provides it to the requesting node (618).

Figure 5:
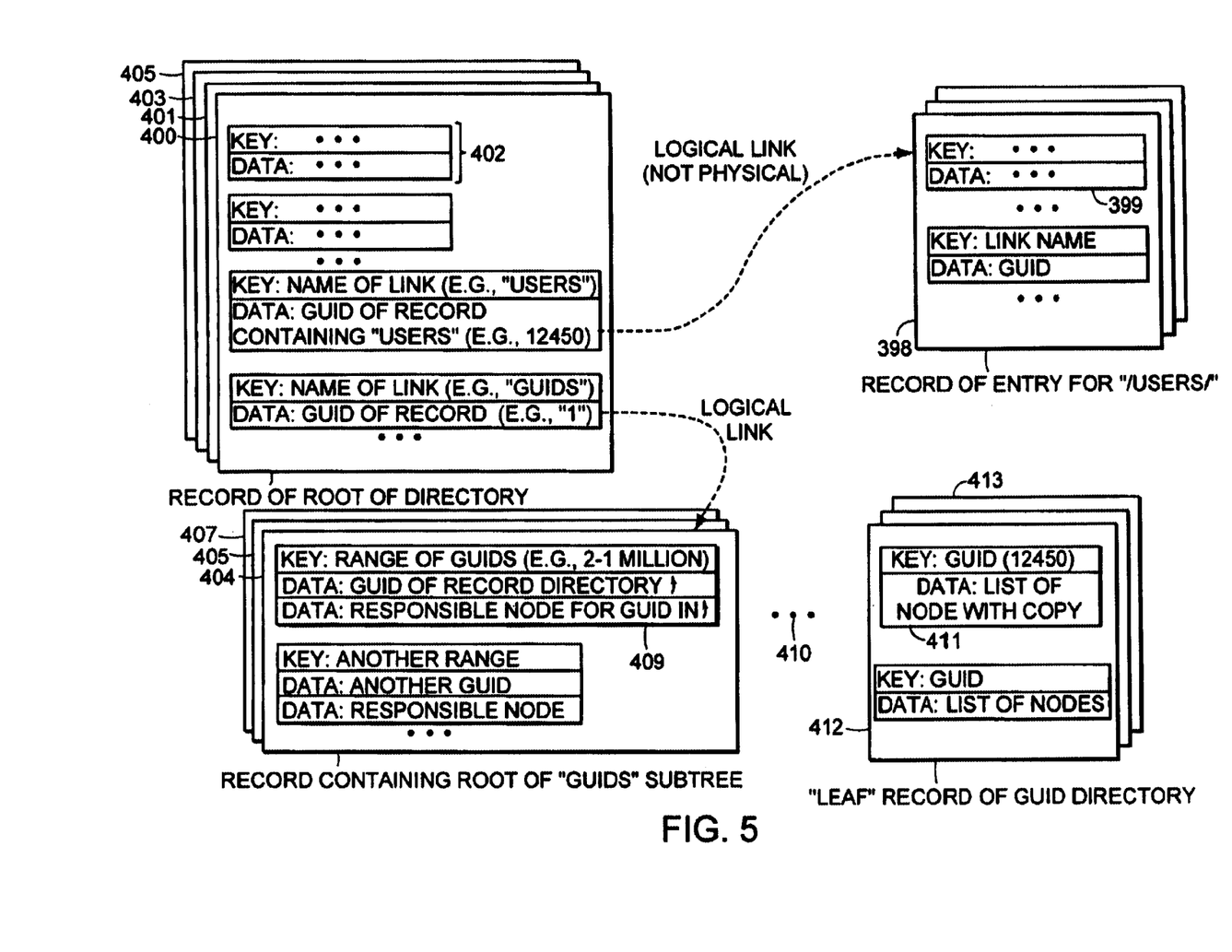
FIG. 5 is a diagram showing an example of directory records of a distributed dynamic directory service according to the invention.

Referring now to FIGS. 4B and 5, a root directory record 400 could be the root record referred to in step 612. If directory 402 contains the requested directory information in its data field (step 616), the directory service need only to index into that entry 402 using the key and retrieve the requested directory information from the data field. Note that, as indicated in FIG. 5, the root directory record 400 could be replicated (401, 403, 405) on three other network nodes in accordance with the replication feature of the directory service of the invention. In fact, it may be that the root directory record 400 is replicated on all network nodes. This could be reasonable in light of the fact that every network node will likely refer to the root directory record when the node first invokes the directory service of the invention, and frequently thereafter.

If the entry in the root directory record does not contain the requested directory information in the entry's data field (step 616 of FIG. 4B), the directory service determines whether the entry's data field contains a GUID (step 620). If it does contain a GUID, this means that the GUID tree must be navigated by the directory service to located the requested directory information. The directory service thus follows the GUID in the root directory record's entry's data field to a new directory record (step 628), possibly the GUID tree root directory record (404 in FIG. 5). The GUID thus is a logical link to a record that will provide more information about the GUID tree structure and ultimately allow the directory service to locate the requested directory information.

As shown in FIG. 5, the GUID in the root directory record's entry's data field can be a logical link or pointer to a record that is the GUID tree root directory record 404. As with the root directory record 400, the GUID tree root directory record 404 is likely to be replicated on many or all of the network nodes. In the example of FIG. 5, two replicas (405, 407) of the record 404 are depicted.

The loop defined by steps 628, 630, and 634 in FIG. 4B illustrates the recursive nature of the directory service. That is, once the GUID tree records are entered via the GUID tree root directory record 404 (FIG. 5), and if the data fields of the appropriate directory entries in the GUID tree records contain GUIDs, the directory service will enter a recursive loop whereby it accesses a plurality of records (identified by the ellipsis 410 in FIG. 5) until it reaches a record that has a directory entry with one or more nodes listed its data field (step 622). Such a record is a leaf of the GUID tree structure, and is indicated as record 412 in FIG. 5. As with all records maintained by the directory service of the invention, this record 412 can be replicated (413) on at least one other network node. Also, while not presently preferred, in general it is possible at any point during this recursive GUID tree walk to encounter a directory entry having the requested directory information in its data field (step 630 of FIG. 4B), and in such a case the directory service would retrieve from the data field the requested directory information and provide it to the requesting node (632).

It is important to note that the cache of locally stored directory entries can be indexed so that at any stage of the GUID tree walk operation it is possible to obtain the desired record from the local cache instead of the tree structure. For example, if record 398 is cached on the node attempting to lookup "/USERS/JONES/PASSWORD," the directory service will be able to find the locally cached record via a hash lookup for either /USERS/JONES/PASSWORD or the corresponding GUID. Similarly, while traversing the GUID subtree, the directory service first always checks to see if entries indexed by a GUID are cached locally before the directory service invokes recursively the GUID tree to locate a copy of the record remotely.

In the course of the recursion, the various records that the directory service accesses lead the directory service to the leaf record 412. This happens by the directory service beginning at the GUID tree root directory record 404 and examining the key field of each of the directory entries in the record 404 (or one of the copies 405, 407 of the record 405 on other nodes in the network) to determine the range in which the GUID logical link from the record 400 falls. If the GUID logical link from the record 400 falls within the range identified by the key field of directory entry 409, the GUID in the data field of the entry 409 is used as the logical link or pointer to the next record. This process continues until the ranges in the key fields of the directory entries of the subsequent records reduce to a single GUID such as the GUID "12540" in the key field of a directory entry 411 in the GUID leaf record 412.

Again, while traversing the GUID subtree, the directory service first always checks to see if entries indexed by a GUID are cached locally before the directory service invokes recursively the GUID tree to locate a copy of the record remotely. In referencing the GUID tree, the directory service uses the responsible node information in the data fields of the GUID tree records in the location process.

It is important to realize that all of these records that the directory service accesses in this recursive loop (and, in general, even when it is not in the recursive loop) can, and in many instances will, be located on different network nodes. This is because the directory service of the invention is distributed, and in general the records that make up the directory and that contain the various pieces of the directory information maintained by the directory service are located on different nodes all over the network. As the GUID tree is walked in the manner described herein, the directory service can replicate the accessed GUID tree records and make them local on the requesting node. This replication is optional and is accomplished as described hereinabove.

It also is important to realize that the records that describe the structure of the directory layout (i.e., the GUID tree records) are stored by the directory service in the same manner as it stores the records having the actual directory information and also maintained by the directory service in the same way that it maintains the records with the actual directory information.

Referring to step 622 of FIG. 4B and record 412 of FIG. 5, the data field in the entry 411 of the GUID leaf record 412 contains a list of nodes. This is a list of nodes that have a copy of the record that contains the requested directory information. The directory service can now access any one of those listed nodes to obtain the requested directory information (step 624).

Instead of going from the root directory record 400 (or any one of its copies 401, 403, 405) to walking the GUID tree to obtain the requested directory information, it is possible that the directory service of the invention will find an entry in the root directory record 400 that provides a logical link (e.g., GUID "12540") in its data field directly to an entry 399 in a record 398 that has the requested directory information in its data field. It also is possible, as mentioned hereinabove, that an entry 402 in the root directory record 400 itself will have the requested directory information in its data field. A typical situation, however, is when the GUID tree is walked by the directory service via the GUID tree records in order to locate and return the requested directory information to the requesting network node.

In accordance with the invention, the directory service tracks ownership and responsibility for directory information thereby providing a level of indirection between the actual directory information itself and the physical location of that directory information on the network.

It should be appreciated that the directory service of the invention comprises a hierarchical structured storage mechanism for directory information. To this end, the directory service of the invention provides a structure that continually subdivides itself into smaller and smaller sections. Further, each section is represented by directory records of the same structure, but each section indexes different amounts (sizes) of directory information.

In accordance with the invention, more frequently accessed directory information is copied and distributed among various network nodes, and rarely used directory information generally will appear on only a few network nodes. Also, directory records will migrate to those nodes that access them most, providing a degree of self-organization that reduces network traffic.

In general, all of the functionality of the directory service of the invention can be implemented in software. In one embodiment, an instance of a directory service program resides and executes on each of the network nodes and provides all of the directory service features and functionality described herein. It is possible to perform one or more of the various functions of the directory service with dedicated electronics or a combination of hardware and software, and this hardware might be added to a general purpose computer to implement the directory service of the invention.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for obtaining directory information, comprising:

providing a plurality of nodes interconnected by a network, each of the plurality of nodes sharing a shared addressable memory space and including (i) a local persistent storage device for persistent storage and (ii) a directory service program for mapping at least a portion of the shared addressable memory space to at least a portion of the persistent storage to provide thereby addressable persistent storage accessible by each of the plurality of nodes;

providing a distributed directory service on the network by utilizing the directory service program on each of the plurality of nodes to allow directory parts to be selectively and dynamically migrated between ones of said plurality of nodes, without requiring restructuring the directory, and storage on said plurality of nodes, including on the local persistent storage devices, of the directory that includes both said directory information and information about the location of the directory information on the network, such that said directory is not statically replicated to all nodes of said plurality of nodes; and obtaining both the location information and the directory information by accessing the distributed directory service.

2. The method of claim 1 wherein the directory service providing step further comprises the step of utilizing the directory service program on each of the plurality of nodes to replicate said directory parts.

3. The method of claim 2 wherein the directory service providing step further comprises the step of utilizing the directory service program on each of the plurality of nodes to selectively and dynamically replicate said directory parts based on the number of accesses of the directory service by each of said nodes.

4. The method of claim 2 wherein the directory service providing step further comprises the step of utilizing the directory service program on each of the plurality of nodes to selectively and dynamically replicate said directory parts based on available resources on the network.

5. The method of claim 1 wherein the distributed directory service providing step further comprises the step of utilizing the directory service program on each of the plurality of nodes to selectively and dynamically migrate said directory parts based on the number of accesses of the distributed directory service by the nodes.

6. The method of claim 1 wherein the distributed directory service providing step further comprises the step of utilizing the directory service program on each of the plurality of nodes to selectively and dynamically migrate said directory parts based on available resources on the network.

7. A system for accessing directory information, comprising:

a computer network; and a plurality of computers coupled to the network, each of the plurality of computers sharing a shared addressable memory space and including (i) a local persistent storage device for persistent storage and (ii) a directory service program for mapping at least a portion of the shared addressable memory space to at least a portion of the persistent storage to provide thereby addressable persistent storage accessible by each of the plurality of computers, each of the computers utilizing the directory service program to achieve a distributed directory service on the network for maintaining directory information, allowing directory parts to be selectively and dynamically migrated between ones of said plurality of computers, without requiring restructuring the directory, and storing on the plurality of computers including on the local persistent storage devices a the directory that includes both the directory information and information about the location of the directory information on the network, such that said directory is not statically replicated to all nodes of said plurality of nodes, and allowing both the location information and the directory information to be obtained by each of the computers.

8. A method for obtaining directory information, comprising:

providing a plurality of nodes interconnected by a network;

providing a distributed directory service on the network by installing on each of the nodes a directory service program that allows directory parts to be selectively and dynamically migrated between ones of said plurality of nodes, without requiring restructuring the directory, storage on said plurality of nodes of the directory that includes both the directory information and information about the location of the directory information on the network, such that said directory is not statically replicated to all nodes of said plurality of nodes; and obtaining both the location information and the directory information by accessing the distributed directory service.

9. The method of claim 8 wherein the directory service providing step further comprises the step of utilizing the directory service program on each of the plurality of nodes to replicate said directory parts.

10. The method of claim 9 wherein the directory service providing step further comprises the step of utilizing the directory service program on each of the plurality of nodes to selectively and dynamically replicate said directory parts based on the number of accesses of the directory service by each of said nodes.

11. The method of claim 9 wherein the directory service providing step further comprises the step of utilizing the directory service program on each of the plurality of nodes to selectively and dynamically replicate said directory parts based on available resources on the network.

12. The method of claim 8 wherein the distributed directory service providing step further comprises the step of utilizing the directory service program on each of the plurality of nodes to selectively and dynamically migrate said directory parts based on the number of accesses of the distributed directory service by the nodes.

13. The method of claim 8 wherein the distributed directory service providing step further comprises the step of utilizing the directory service program on each of the plurality of nodes to selectively and dynamically migrate said directory parts based on available resources on the network.

14. A system for accessing directory information, comprising:

a computer network; and a plurality of computers coupled to the network, each of the computers having a directory service program installed thereon, the plurality of computers with the programs comprising a distributed directory service on the network for maintaining directory information, allowing directory parts to be selectively and dynamically migrated between ones of said plurality of computers, without requiring restructuring the director, and storing on the plurality of computers the directory that includes both the directory information and information about the location of the directory information on the network, such that said directory is not statically replicated to all nodes of said plurality of nodes, and allowing both the location information and the directory information to be obtained by each of the computers.

* * * * *